United States Patent
Chen et al.

(10) Patent No.: US 10,871,706 B2
(45) Date of Patent: Dec. 22, 2020

(54) PROJECTION APPARATUS AND ILLUMINATION SYSTEM

(71) Applicant: Coretronic Corporation, Hsin-Chu (TW)

(72) Inventors: Chang-Hsuan Chen, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/280,058

(22) Filed: Feb. 20, 2019

(65) Prior Publication Data

US 2019/0324357 A1    Oct. 24, 2019

(30) Foreign Application Priority Data

Apr. 20, 2018  (CN) ............................ 2018 1 0365319
Nov. 16, 2018  (CN) ........................ 2018 2 1887561 U

(51) Int. Cl.
    *G03B 21/20*    (2006.01)
    *F21K 9/64*     (2016.01)
    *F21V 9/30*     (2018.01)

(52) U.S. Cl.
    CPC .......... *G03B 21/204* (2013.01); *G03B 21/208* (2013.01); *G03B 21/2013* (2013.01);
    (Continued)

(58) Field of Classification Search
    CPC ..... F21K 9/64; F21K 9/65; F21V 9/30; G03B 21/00; G03B 21/20; G03B 21/2013; G03B 21/2033; G03B 21/204; G03B 21/208
    See application file for complete search history.

(56) References Cited

U.S. PATENT DOCUMENTS

2009/0097230 A1* 4/2009 Masuda ............ G02F 1/133606
                                                    362/97.2
2012/0075593 A1* 3/2012 Kang ................. G02B 3/0062
                                                    353/38
(Continued)

FOREIGN PATENT DOCUMENTS

CN    102722027    10/2014
CN    103901707    2/2016
(Continued)

OTHER PUBLICATIONS

"Search Report of Europe Counterpart Application," dated Sep. 6, 2019, pp. 1-7.

*Primary Examiner* — Zheng Song
(74) *Attorney, Agent, or Firm* — JCIPRNET

(57) ABSTRACT

A projection apparatus and an illumination system are provided. The illumination system includes a light source, a first lens element and an optical wavelength conversion module. The light source emits a light beam. The first lens element is disposed on a transmission path of the light beam from the light source. The first lens element has a curved surface and a multidirectional-plane. The multidirectional-plane and the curved surface are disposed opposite to each other. The multidirectional-plane includes sub-planes facing different directions. The optical wavelength conversion module is disposed on a transmission path of the light beam from the first lens element. The optical wavelength conversion module converts a first portion of the light beam from the first lens element into a converted light beam. The converted light beam and a second portion of the light beam from the first lens element form an illumination beam.

10 Claims, 10 Drawing Sheets

(52) U.S. Cl.
CPC ............... *F21K 9/64* (2016.08); *F21V 9/30* (2018.02); *G03B 21/20* (2013.01); *G03B 21/2033* (2013.01)

(56) References Cited

U.S. PATENT DOCUMENTS

| | | | |
|---|---|---|---|
| 2015/0015850 A1* | 1/2015 | Cho | G03B 21/142 |
| | | | 353/31 |
| 2015/0036107 A1* | 2/2015 | Nagahara | G03B 21/208 |
| | | | 353/31 |
| 2015/0077714 A1* | 3/2015 | Hsieh | H04N 9/3161 |
| | | | 353/31 |
| 2015/0219984 A1* | 8/2015 | Matsubara | G02B 26/008 |
| | | | 353/31 |
| 2016/0173837 A1* | 6/2016 | Miyata | G03B 21/2013 |
| | | | 353/31 |
| 2017/0059976 A1 | 3/2017 | Wang et al. | |
| 2017/0199450 A1* | 7/2017 | Matsubara | G03B 21/2033 |
| 2018/0149957 A1* | 5/2018 | Maeda | G02B 26/008 |

FOREIGN PATENT DOCUMENTS

| | | |
|---|---|---|
| CN | 107203089 | 9/2017 |
| TW | 201213858 | 4/2012 |
| TW | I509344 | 11/2015 |
| TW | I575300 | 3/2017 |

\* cited by examiner

PROJECTION APPARATUS AND ILLUMINATION SYSTEM

CROSS-REFERENCE TO RELATED APPLICATION

This application claims the priority benefit of China application serial no. 201810365319.2, filed on Apr. 20, 2018 and China application serial no. 201821887561.8, filed on Nov. 16, 2018. The entirety of each of the above-mentioned patent applications is hereby incorporated by reference herein and made a part of this specification.

BACKGROUND OF THE INVENTION

Field of the Invention

The invention relates to an optical apparatus and an optical system, and particularly relates to a projection apparatus and an illumination system.

Background of the Invention

Projection apparatus generally uses light-emitting elements in collaboration with an optical wavelength conversion module (such as a phosphor layer) to produce light beams for illumination. However, the phosphor layer may absorb external energy. Under continuous irradiation of a high-energy light beam (such as a laser beam), the temperature of the phosphor layer rises, which results in decrease of light conversion efficiency thereof or even burning of the phosphor layer.

The information disclosed in this "BACKGROUND OF THE INVENTION" is only for enhancement of understanding of the background of the described technology and therefore it may contain information that does not form the prior art that is already known to a person of ordinary skill in the art. Further, the information disclosed in the "BACKGROUND OF THE INVENTION" does not mean that one or more problems to be resolved by one or more embodiments of the invention was acknowledged by a person of ordinary skill in the art.

SUMMARY OF THE INVENTION

The invention provides an illumination system, which avails mitigating problems of burning of an optical wavelength conversion module and decrease of light conversion efficiency due to over concentration of beam energy.

The invention also provides a projection apparatus, which has good performance.

Other objects and advantages of the invention can be further illustrated by the technical features broadly embodied and described as follows.

In order to achieve one or a portion of or all of the objects or other objects, an embodiment of the invention provides an illumination system including a light source, a first lens element and an optical wavelength conversion module. The light source emits a light beam. The first lens element is disposed on a transmission path of the light beam emitted from the light source. The first lens element has a curved surface and a multidirectional-plane. The multidirectional-plane and the curved surface are disposed opposite to each other. The multidirectional-plane includes a plurality of sub-planes facing different directions. The optical wavelength conversion module is disposed on a transmission path of the light beam transmitted from the first lens element. The optical wavelength conversion module converts a first portion of the light beam transmitted from the first lens element into a converted light beam. The converted light beam and a second portion of the light beam transmitted from the first lens element form an illumination beam.

In order to achieve one or a portion of or all of the objects or other objects, an embodiment of the invention provides a projection apparatus including the aforementioned illumination system, a light valve and a projection lens. The light valve is disposed on a transmission path of the illumination beam and converts the illumination beam into an image beam. The projection lens is disposed on a transmission path of the image beam.

Based on the above description, the embodiments of the invention have at least one of following advantages or effects. The multidirectional-plane is adapted to refract the light beam to different positions of the optical wavelength conversion module to achieve an effect of dispersing energy density of the light beam. Therefore, the illumination system of the embodiments of the invention is adapted to effectively mitigate problems of burning of the optical wavelength conversion module and decrease of light conversion efficiency due to over concentration of beam energy. Moreover, the projection apparatus of the embodiments of the invention adopts the aforementioned illumination system has good performance.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a portion of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
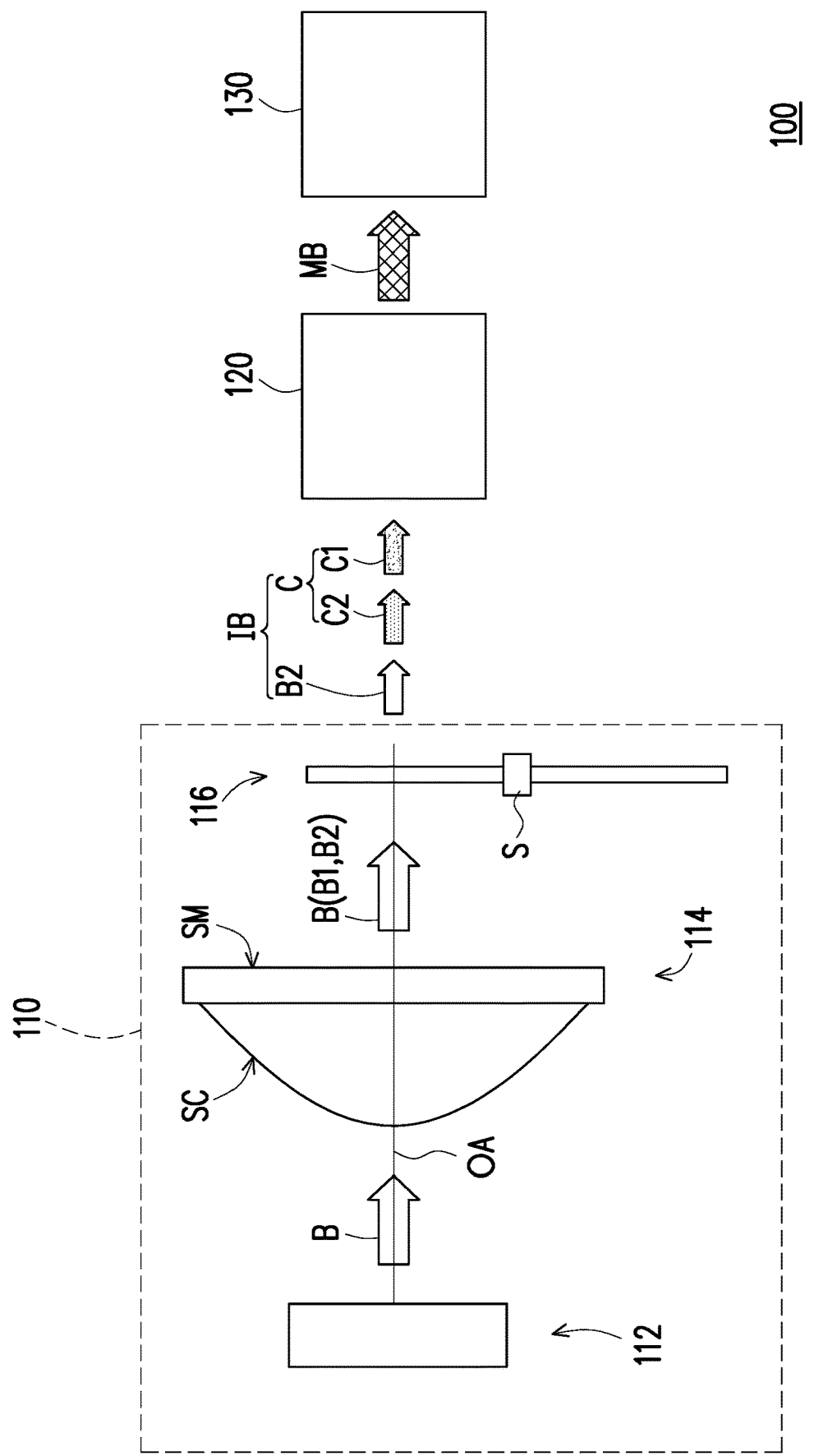
FIG. 1 is a schematic diagram of a projection apparatus according to a first embodiment of the invention.

FIG. 1 is a schematic diagram of a projection apparatus according to a first embodiment of the invention. Referring to FIG. 1, a projection apparatus 100 of the first embodiment of the invention includes an illumination system 110, a light valve 120 and a projection lens 130. The illumination system 110 includes a light source 112, a first lens element 114 and an optical wavelength conversion module 116. The light source 112 emits a light beam B. The first lens element 114 is disposed on a transmission path of the light beam B emitted from the light source 112. The optical wavelength conversion module 116 is disposed on a transmission path of the light beam B transmitted from the first lens element 114. The optical wavelength conversion module 116 converts a first portion B1 of the light beam B from the first lens element 114 into a converted light beam C. The converted light beam C and a second portion B2 of the light beam B transmitted from the first lens element 114 form an illumination beam IB. The light valve 120 is disposed on a transmission path of the illumination beam IB and converts the illumination beam IB into an image beam MB. The projection lens 130 is disposed on a transmission path of the image beam MB.

Further, the light source 112 may include a plurality of light-emitting elements (not shown). The light-emitting elements may include a plurality of visible light-emitting elements, a plurality of non-invisible light-emitting elements or a combination of the above two kinds of light-emitting elements. The visible light-emitting elements may be light-emitting diodes (LEDs) or laser diodes (LDs), such as blue light-emitting diodes or blue laser diodes, though the invention is not limited thereto. The non-invisible light-emitting elements may include ultraviolet light-emitting diodes, though the invention is not limited thereto.

The first lens element 114 has a curved surface SC and a multidirectional-plane SM. The multidirectional-plane SM and the curved surface SC are disposed opposite to each other. Further, the multidirectional-plane SM and the curved surface SC are respectively two opposite surfaces in the first lens element 114 that are penetrated by an optical axis OA of the illumination system 110. In the embodiment, the curved surface SC is located between the light source 112 and the multidirectional-plane SM, i.e. the light beam B emitted from the light source 112 sequentially passes through the curved surface SC and the multidirectional-plane SM of the first lens element 114, though the invention is not limited thereto. In another embodiment, the multidirectional-plane SM may be located between the light source 112 and the curved surface SC, i.e. the light beam B from the light source 112 sequentially passes through the multidirectional-plane SM and the curved surface SC of the first lens element 114.

In the embodiment, the first lens element 114 is a focusing lens, which is adapted to converge the light beam B emitted from the light source 112 to the optical wavelength conversion module 116. Correspondingly, the curved surface SC of the first lens element 114 is a convex surface adapted to converge light beams.

The multidirectional-plane SM includes a plurality of sub-planes facing different directions, so as to refract the light beam passing through the curved surface SC to different positions of the optical wavelength conversion module 116. Herein, "the plurality of sub-planes facing different directions" may include a situation that "the directions faced by the sub-planes are all different" and a situation that "the directions faced by the sub-planes are partially the same and partially different".

Figure 2A:
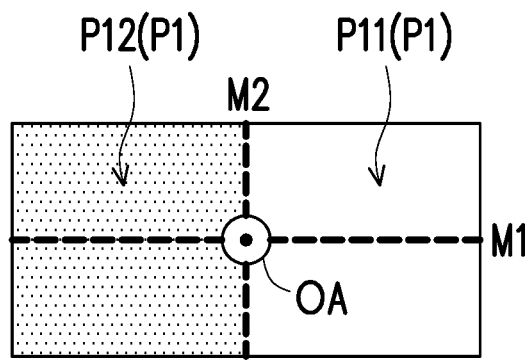
FIG. 2A is a front view of a first implementation of a multidirectional-plane in FIG. 1.
Figure 2B:
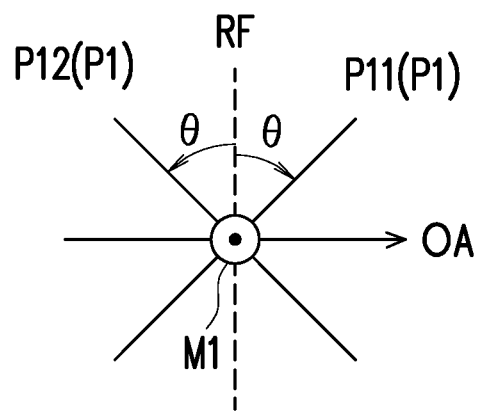
FIG. 2B is a side view of a plurality of sub-planes of the multidirectional-plane in FIG. 2A, which is used for explaining orientations of the sub-planes.

FIG. 2A is a front view of a first implementation of the multidirectional-plane in FIG. 1. FIG. 2B is a side view of a plurality of sub-planes of the multidirectional-plane in FIG. 2A, which is used for explaining orientations of the sub-planes. Referring to FIG. 2A, the multidirectional-plane SM has a first midline M1 and a second midline M2, where the first midline M1 and the second midline M2 are perpendicular to each other, and the first midline M1 and the second midline M2 are respectively perpendicular to the optical axis OA of the illumination system 110. In the embodiment, a shape of the multidirectional-plane SM is a rectangle, where the first midline M1 is formed by connecting two midpoints of a pair of short sides of the rectangle, and the second midline M2 is formed by connecting two midpoints of a pair of long sides of the rectangle. However, the shape of the multidirectional-plane SM may be changed according to an actual requirement. For example, the shape of the multidirectional-plane SM may also be a round, other types of quadrangle or other polygon. Moreover, the first midline M1 and the second midline M2 are defined to facilitate subsequent descriptions, so that the first midline M1 and the second midline M2 are unnecessary to be actually indicated on the multidirectional-plane SM.

In the embodiment, the multidirectional-plane SM includes two first sub-planes P1, such as a first sub-plane P11 and a first sub-plane P12 shown in FIG. 2A, where the first sub-plane P11 and the first sub-plane P12 are respectively located at two opposite sides of the second midline M2. Referring to FIG. 2B, the first sub-plane P11 and the first sub-plane P12 are respectively rotated along the first midline M1 of the multidirectional-plane SM by different angles with a reference plane RF, and the reference plane RF is perpendicular to the optical axis OA of the illumination system 110. Herein, the concept of "rotated along the first midline M1 of the multidirectional-plane SM by different angles" may include a situation of "opposite rotating directions but the same rotating angle" and a situation of "the same rotating direction (i.e. the same clockwise rotation or the same counterclockwise rotation) but different rotating angles". FIG. 2B illustrates the first sub-plane P11 and the second sub-plane P12 in the aforementioned situation of "opposite rotating directions but the same rotating angle" (the rotating angles are all θ). Further, in FIG. 2B, the first sub-plane P11 is rotated clockwise from the reference plane RF by the rotating angle θ along the first midline M1, and the first sub-plane P12 is rotated counterclockwise from the reference plane RF by the rotating angle θ along the first midline M1.

Figure 3A:
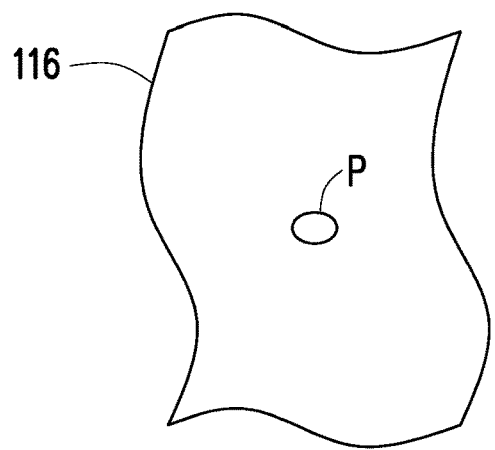
FIG. 3A to FIG. 3C are respectively partial front views of an optical wavelength conversion module of FIG. 1, which are used for representing light spots formed on the optical wavelength conversion module in three cases that the multidirectional-plane is not configured, the multidirectional-plane of FIG. 2A is configured, and the multidirectional-plane of FIG. 2A and a light diffusing element are configured.
Figure 3B:
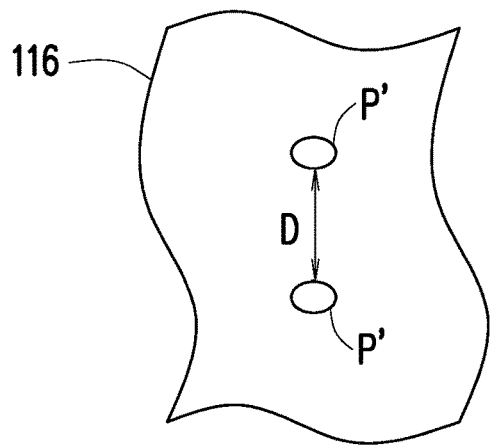
Figure 3C:
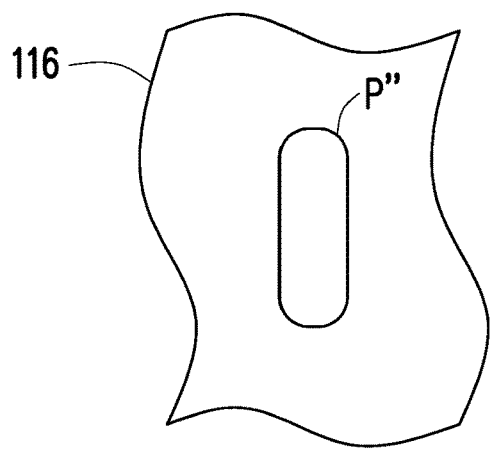

FIG. 3A to FIG. 3C are respectively partial front views of the optical wavelength conversion module of FIG. 1, which are used for representing light spots formed on the optical wavelength conversion module in three cases that the multidirectional-plane is not configured, the multidirectional-plane of FIG. 2A is configured, and the multidirectional-plane of FIG. 2A and a light diffusing element are configured. Further, FIG. 3A is a schematic diagram of the light spot obtained by using a conventional plano-convex lens to replace the first lens element 114 of FIG. 1, and FIG. 3C is a schematic diagram of the light spot obtained by further configuring the light diffusing element between the light source 112 and the first lens element 114 or between the first lens element 114 and the optical wavelength conversion module 116 under the framework of FIG. 1 to FIG. 2B.

By comparing FIG. 3A with FIG. 3B, it is discovered that by forming different rotating angles between a plurality of first sub-planes and the reference plane RF (referring to FIG. 2B), one light spot P shown in FIG. 3A may be separated into a plurality of light spots P' shown in FIG. 3B in an extending direction of the second midline M2 (referring to FIG. 2A). Therefore, through the design of the multidirectional-plane, the light beam is refracted to different positions of the optical wavelength conversion module 116 (i.e. to form the light spots P' at different positions of the optical wavelength conversion module 116), so as to achieve an effect of reducing the energy density of the light beam. In this way, the illumination system 110 of the embodiment may effectively mitigate the problems of burning of the optical wavelength conversion module and decrease of light conversion efficiency due to over concentration of the light beam energy. Moreover, the projection apparatus 100 applying the illumination system 110 of the embodiment may have good performance (for example, have good light conversion efficiency and light receiving efficiency).

It should be noted that the larger the rotating angle of the sub-plane is, the more obvious the light beam is refracted, for example, referring to FIG. 1 and FIG. 2B, the larger the clockwise rotating angle of the sub-plane is, the more obvious the light beam B is deviated upward (i.e. the more obvious the light beam B is deviated to the edge of the optical wavelength conversion module 116); and the larger the counterclockwise rotating angle of the sub-plane is, the more obvious the light beam B is deviated downward (i.e. the more obvious the light beam B is deviated to a center rotation shaft S of the optical wavelength conversion module 116). Therefore, the larger the rotating angle of the sub-plane is, the larger a distance D between a plurality of light spots P' of FIG. 3B is. However, when the rotating angle of the sub-plane is excessively large, it may cause unnecessary light loss, such that a light usage rate is decreased. Moreover, under the same rotating angle, the farther the distance between the multidirectional-plane and the optical wavelength conversion module is, the more obvious the light beam is refracted. Therefore, the respective rotating angles of the plurality of sub-planes may be adjusted according to the distance between the multidirectional-plane and the optical wavelength conversion module and/or the required shape of the light spot, etc. Under the framework of FIG. 1, the rotating angles of the first sub-planes are, for example, respectively greater than 0 degrees and smaller than or equal to 6 degrees.

By comparing FIG. 3B with FIG. 3C, it is discovered that if a light diffusing element is further configured under the framework of FIG. 1, the separated light spots P' in FIG. 3B may form one light spot P''' extending along an extending direction of the second midline M2 (referring to FIG. 2B) in FIG. 3C. In other words, the disposition of the light diffusing element may further make energy distribution of the light spot P''' on the optical wavelength conversion module 116 to be more uniform in the extending direction of the second midline M2 (referring to FIG. 2B). Therefore, under the framework of FIG. 1, the light diffusing element may be disposed between the light source 112 and the first lens element 114 or between the first lens element 114 and the optical wavelength conversion module 116. The light diffusing element may include a diffuser, a lens array or a lenticular lens, though the invention is not limited thereto. However, in the framework of FIG. 1, the light diffusing element may also be omitted, so as to decrease the cost and/or the influence of assembling tolerance on performance.

Referring to FIG. 1 again, the optical wavelength conversion module 116 may include an optical wavelength conversion layer (not shown), a substrate (not shown) carrying the optical wavelength conversion layer, the center rotation shaft S penetrating through a center of the substrate and a motor (not shown) connected to the center rotation shaft S. A material of the optical wavelength conversion layer may include phosphor powder, quantum dots or a combination of the two types of materials. The substrate may be a transparent substrate or a reflective substrate (for example, a metal substrate), and the motor is used for driving the substrate to rotate around the center rotation shaft S. In the embodiment, the optical wavelength conversion module 116 is a transmissive optical wavelength conversion module 116. Further, the substrate is a transparent substrate, and the transparent substrate has a penetration region and at least one light conversion region. The penetration region and the at least one light conversion region are arranged on the edge of the substrate and are surrounded the center rotation shaft S. The optical wavelength conversion layer is located in the at least one light conversion region and exposes the penetration region. The at least one light conversion region and the penetration region cut into a transmission path of the light beam B transmitted from the first lens element 114 in turn. When the at least one light conversion region cuts into the transmission path of the light beam B from the first lens element 114, a first portion B1 of the light beam B is converted into a converted light beam C by the optical wavelength conversion layer, and the converted light beam C passes through the transparent substrate and transmits toward the light valve 120. When the penetration region cuts into the transmission path of the light beam B from the first lens element 114, a second portion B2 of the light beam B passes through the transparent substrate and transmits toward the light valve 120. The substrate of the optical wavelength conversion module 116 is rotated by driving of the motor (not shown). The at least one light conversion region and a non-light-conversion region (ex. the above penetration region) of the optical wavelength conversion module 116 is irradiated by the light beam B in turn with the rotation of the substrate. The above mentioned first portion B1 of the light beam B is the light incident on the at least one light conversion region. The above mentioned second portion B2 of the light beam B is the light incident on the non-light-conversion region (ex. the above penetration region). To be more specific, in the embodiment, when the at least one light conversion region is rotated into the transmission path of the light beam B, the light beam B irradiating the at least one light conversion region is defined as the first portion B1 thereof and is converted into the conversion light beam C. When the non-light-conversion region (ex. the above penetration region) is rotated into the transmission path of the light beam B, the light beam B irradiating the non-light-conversion region (ex. the above penetration region) is defined as the second portion B2 thereof and is transmitted to the light valve 120 by passing through the transparent substrate. In other words, "the first portion of the light beam" and "the second portion of the light beam" presented in the specification and the claims of the invention are not the light beam including two kinds of beams or two beams, but the light beam B emitted from the light source 112 and irradiating the optical wavelength conversion module 116 in different periods of time. For example, the light beam B respectively irradiates the at least one light conversion region and the non-light-conversion region (ex. the above penetration region) in different periods of time. The description of "the first portion of the light beam" and "the second portion of the light beam" used herein may conveniently show that the light beam B respectively irradiates the at least one light conversion region and the non-light-conversion region (ex. the above penetration region) in different periods of time. In brief, the first portion B1 of the light beam B is the light incident on the at least one light conversion region, because the light B1 transmitted to the at least one light conversion region is converted into the conversion light beam C by the at least one light conversion region when the at least one light conversion region cuts into the transmission path of the light beam B. Therefore, the second portion B2 of the light beam B is the light incident on the non-light-conversion region (ex. the above penetration region). Similarly, in another embodiment, the substrate is a reflective substrate (for example, a metal substrate), the non-light-conversion region may be a penetration region or a non-penetration region. When the non-light-conversion region is non-penetration region, the non-light-conversion region may be a partial region of the metal substrate. Meanwhile, the second portion B2 of the light beam B is the light incident on the non-light-conversion region of the metal substrate.

In the embodiment, the transparent substrate has two light conversion regions, such as a red light conversion region and a green light conversion region, which are respectively used for converting the light beam B into a red light beam C1 and a green light beam C2. Moreover, the optical wavelength conversion layer includes a red optical wavelength conversion material and a green optical wavelength conversion material, where the red optical wavelength conversion material is located in the red light conversion region and exposes the penetration region and the green light conversion region, and the green optical wavelength conversion material is located in the green light conversion region and exposes the penetration region and the red light conversion region. The red light conversion region, the green light conversion region and the penetration region, for example, cut into the transmission path of the light beam B transmitted from the first lens element 114 in turn, such that the red light beam C1, the green light beam C2 and the blue light beam (the second portion B2 of the light beam B) are sequentially outputted from the optical wavelength conversion module 116 and transmitted toward the light valve 120.

In an embodiment, the optical wavelength conversion module 116 may only have one light conversion region (for example, a yellow light conversion region), which is used for converting the light beam B into the yellow light beam, and the optical wavelength conversion module 116 may be integrated with filter elements (not shown) to output the red light beam, the green light beam and the blue light beam, though the invention is not limited thereto. In another embodiment, the filter elements may be disposed between the optical wavelength conversion module 116 and the light valve 120. Moreover, at least one lens element may be further disposed between the optical wavelength conversion module 116 and the filter elements and/or between the first lens element 114 and the optical wavelength conversion module 116. Moreover, a light uniformizing element may be further disposed between the filter elements and the light valve 120, and the light uniformizing element may be, for example, an integration rod.

The light valve 120 may include a Digital Micro-mirror Device (DMD), a reflective Liquid Crystal on Silicon (LCOS) or a transmissive spatial light modulator, such as a transparent liquid crystal panel, though the invention is not limited thereto. The projection lens 130 is adapted to project the image beam MB from the light valve 120 to an imaging surface (not shown), and the projection lens 130 may be any type of projection lens, which is not limited by the invention.

Figure 4:
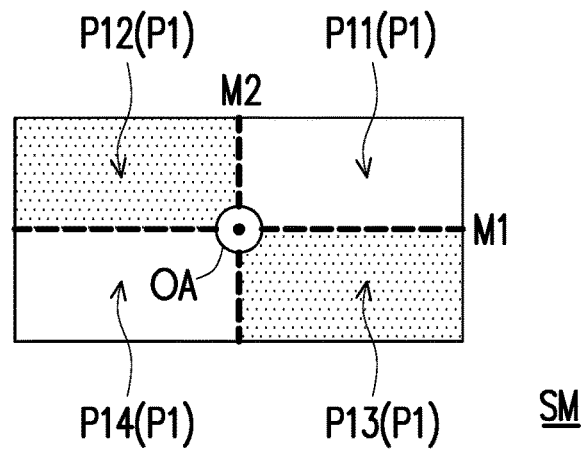
FIG. 4 is a front view of a second implementation of the multidirectional-plane of FIG. 1.

It should be noted that the multidirectional-plane SM of FIG. 1 is not limited to be constructed by the first sub-plane P11 and the first sub-plane P12 shown in FIG. 2A and FIG. 2B. For example, in an embodiment, the number of the first sub-planes included in the multidirectional-plane SM of FIG. 1 may be greater than 2. FIG. 4 is a front view of a second implementation of the multidirectional-plane SM of FIG. 1. As shown in FIG. 4, the multidirectional-plane SM may include four first sub-planes P1, such as a first sub-plane P11, a first sub-plane P12, a first sub-plane P13 and a first sub-plane P14. By controlling rotation angles of these sub-planes P1, the light beam may be refracted to different positions of the optical wavelength conversion module (i.e. to form the light spots at different positions of the optical wavelength conversion module), so as to achieve the effect of reducing the energy density of the light beam.

Figure 5A:
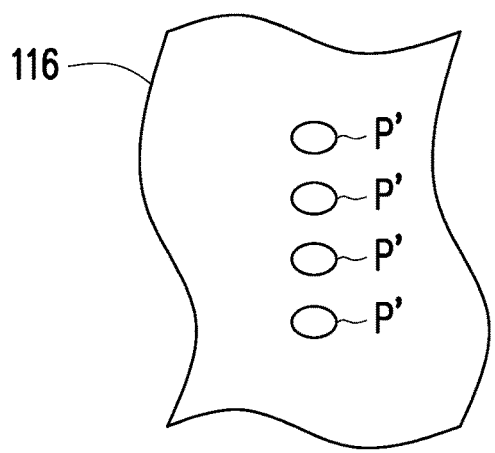
FIG. 5A and FIG. 5B are respectively partial front views of the optical wavelength conversion module of FIG. 1, which are used for representing light spots formed on the optical wavelength conversion module in case that the multidirectional-plane of FIG. 4 is configured and in case that the multidirectional-plane of FIG. 4 and a light diffusing element are configured.
Figure 5B:
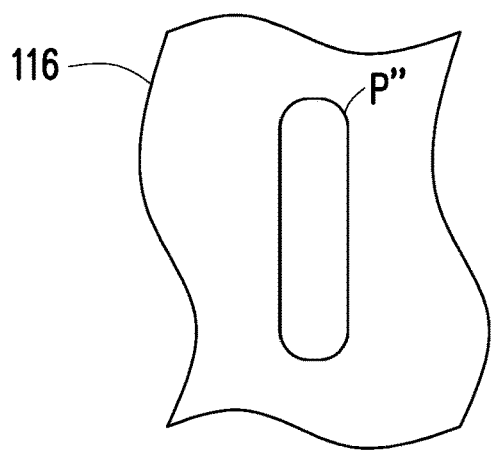

FIG. 5A and FIG. 5B are respectively partial front views of the optical wavelength conversion module of FIG. 1, which are used for representing light spots formed on the optical wavelength conversion module in case that the multidirectional-plane of FIG. 4 is configured and in case that the multidirectional-plane of FIG. 4 and the light diffusing element are configured. Further, the light spots P' in FIG. 5A are obtained under a following case: the first sub-plane P11 and the first sub-plane P12 of FIG. 4 are respectively rotated clockwise along the first midline M1 of the multidirectional-plane SM by different angles with a reference plane RF the reference plane RF of FIG. 2B, and the first sub-plane P13 and the first sub-plane P14 of FIG. 4 are respectively rotated counterclockwise along the first midline M1 of the multidirectional-plane SM by different angles with a reference plane RF of FIG. 2B. In the embodiment, rotation angles of the four first sub-planes P1 are respectively greater than 0 degrees and smaller than or equal to 4 degrees. If the clockwise rotation is represented by a positive value, and the counterclockwise rotation is represented by a negative value, the rotated angles of the four first sub-planes P1 may be any of the following angle combinations: ±0.5 degrees and ±1.5 degrees, ±1 degree and ±2.5 degrees, ±1.5 degrees and ±2.5 degrees, ±1 degree and ±3 degrees, or ±1.5 degrees and ±4 degrees.

As shown in FIG. 5B, when the framework of FIG. 1 adopts the multidirectional-plane SM of FIG. 4, the light diffusing element (for example, a diffuser, a lens array or a lenticular lens) may be selectively configured, such that energy distribution of the light spot P''' on the optical wavelength conversion module 116 is more uniform in the extending direction of the second midline M2 (referring to FIG. 2B).

It should be noted that the sub-planes of the multidirectional-plane SM are not limited to be rotated along the first midline M1 of the multidirectional-plane SM of FIG. 2A by different angles with the reference plane RF. In an embodiment, the sub-planes of the multidirectional-plane SM of FIG. 1 may also be respectively rotated along the second midline M2 of FIG. 2A by different angles with the reference plane RF. When the sub-planes are respectively rotated along the second midline M2 of FIG. 2A by different angles with the reference plane RF, the light spots formed on the optical wavelength conversion module 116 are arranged along an extending direction of the first midline M1 in FIG. 2A.

Figure 6:
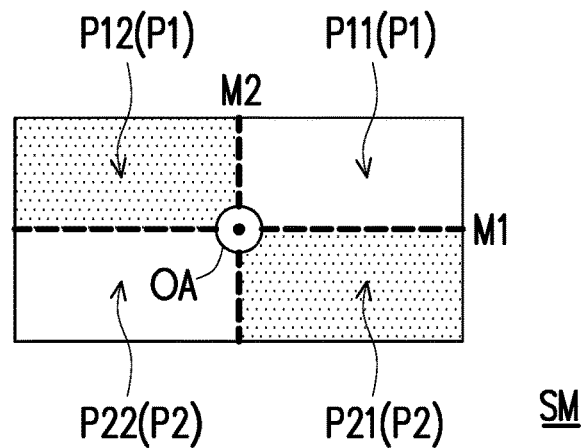
FIG. 6 is a front view of a third implementation of the multidirectional-plane of FIG. 1.

Moreover, the sub-planes of the multidirectional-plane SM of FIG. 1 are not limited to be rotated along a single midline by different angles with the reference plane RF. In another embodiment, the sub-planes of the multidirectional-plane SM of FIG. 1 may include a plurality of first sub-planes rotated along the first midline M1 of FIG. 2A by different angles with the reference plane and a plurality of second sub-planes rotated along the second midline M2 of FIG. 2A by different angles with the reference plane. FIG. 6 is a front view of a third implementation of the multidirectional-plane of FIG. 1. As shown in FIG. 6, the multidirectional-plane SM may include a plurality of first sub-planes P1 (for example, the first sub-plane P11 and the first sub-plane P12) rotated along the first midline M1 of FIG. 2A by different angles with the reference plane and a plurality of second sub-planes P2 (for example, a second sub-plane P21 and a second sub-plane P22) rotated along the first midline M2 of FIG. 2A by different angles with the reference plane.

Figure 7A:
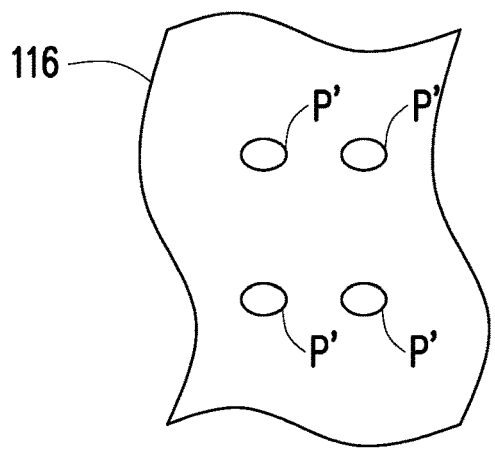
FIG. 7A and FIG. 7B are respectively partial front views of the optical wavelength conversion module of FIG. 1, which are used for representing light spots formed on the optical wavelength conversion module in case that the multidirectional-plane of FIG. 6 is configured and in case that the multidirectional-plane of FIG. 6 and a light diffusing element are configured.
Figure 7B:
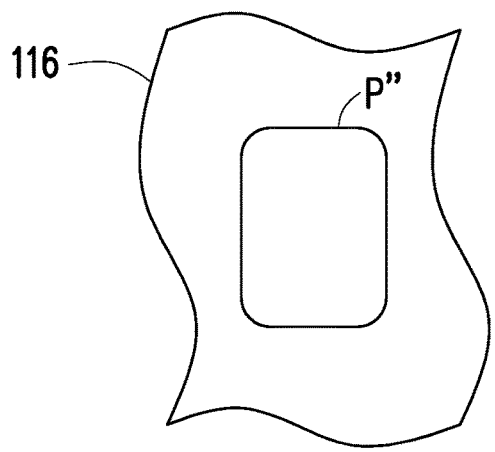

FIG. 7A and FIG. 7B are respectively partial front views of the optical wavelength conversion module of FIG. 1, which are used for representing light spots formed on the optical wavelength conversion module in case that the multidirectional-plane of FIG. 6 is configured and in case that the multidirectional-plane of FIG. 6 and the light diffusing element are configured. Further, the light spots P' in FIG. 7A are obtained under a following case: the first sub-plane P11 and the first sub-plane P12 of FIG. 6 are respectively rotated along the first midline M1 by different angles with the reference plane RF of FIG. 2B, and the second sub-plane P21 and the second sub-plane P22 of FIG. 6 are respectively rotated along the first midline M2 by rotated along the first midline M1 with the reference plane RF of FIG. 2B. In the embodiment, rotation angles of the first sub-planes P1 are respectively greater than 0 degrees and smaller than or equal to 6 degrees, and rotation angles of the second sub-planes P2 are respectively greater than 0 degrees and smaller than or equal to 6 degrees. Through the above design, the light spots P' are arranged along the extending directions of the second midline M2 and the first midline M1 of FIG. 2A.

As shown in FIG. 7B, when the framework of FIG. 1 adopts the multidirectional-plane SM of FIG. 6, the light diffusing element (for example, a diffuser, a lens array or a lenticular lens) may be selectively configured, such that energy distribution of the light spot P''' on the optical wavelength conversion module 116 is more uniform.

Figure 8A:
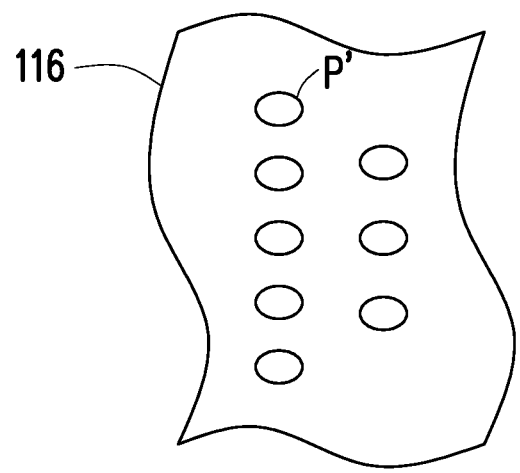
FIG. 8A and FIG. 8B are respectively partial front views of the optical wavelength conversion module of FIG. 1, which are used for representing light spots formed on the optical wavelength conversion module in case that the multidirectional-plane with eight sub-planes is configured and in case that the multidirectional-plane with eight sub-planes and a light diffusing element are configured.
Figure 8B:
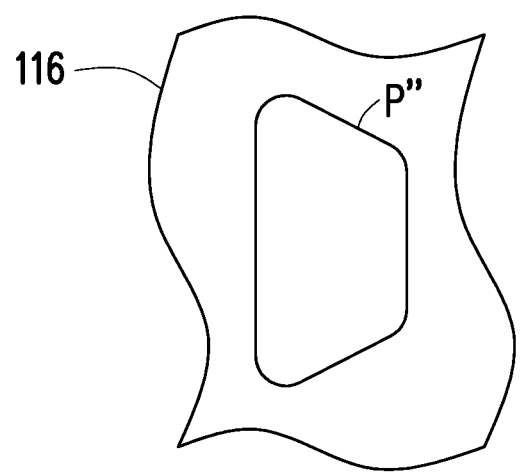

FIG. 8A and FIG. 8B are respectively partial front views of the optical wavelength conversion module of FIG. 1, which are used for representing light spots formed on the optical wavelength conversion module in case that the multidirectional-plane with eight sub-planes is configured and in case that the multidirectional-plane with eight sub-planes and the light diffusing element are configured. As shown in FIG. 8A and FIG. 8B, distribution of the light spots P' may be controlled by adjusting the numbers and the rotating angles of the first sub-planes and the second sub-planes in the multidirectional-plane, for example, the light spots are divided into a left-right ratio of 5:3 (shown in FIG. 8A), and the light diffusing element (for example, a diffuser, a lens array or a lenticular lens) is adopted to further uniform the energy distribution of the light spot P on the optical wavelength conversion module 116, so as to obtain a light spot P''' close to a trapezoid (shown in FIG. 8B), which is adapted to an asymmetrical optical engine system.

It should be noted that respective shapes of the sub-planes of the multidirectional-plane and a relative configuration relationship of the sub-planes may be changed according to an actual requirement. For example, the shapes of the sub-planes may be triangles, quadrilaterals, pentagons, hexagons, other polygons, a combination of two or more of the above polygons or irregular shapes. Moreover, the sub-planes may be arranged along the extending direction of the first midline or the second midline, or arranged in other proper manner, for example, arranged in an array, obliquely arranged or arranged in a honeycomb shape. The following embodiments may be amended accordingly, and details thereof are not repeated.

Figure 9:
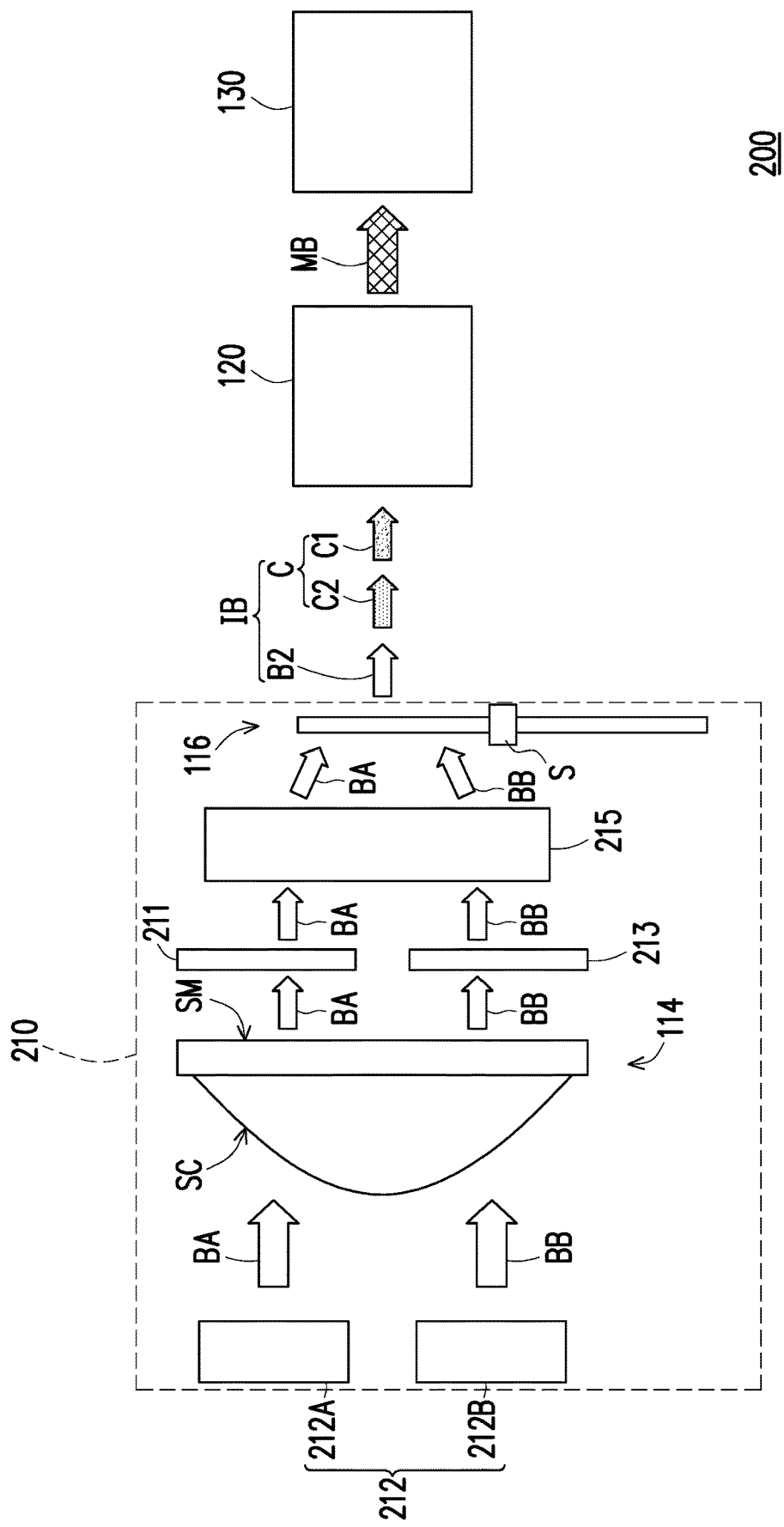
FIG. 9 is a schematic diagram of a projection apparatus according to a second embodiment of the invention.
Figure 10A:
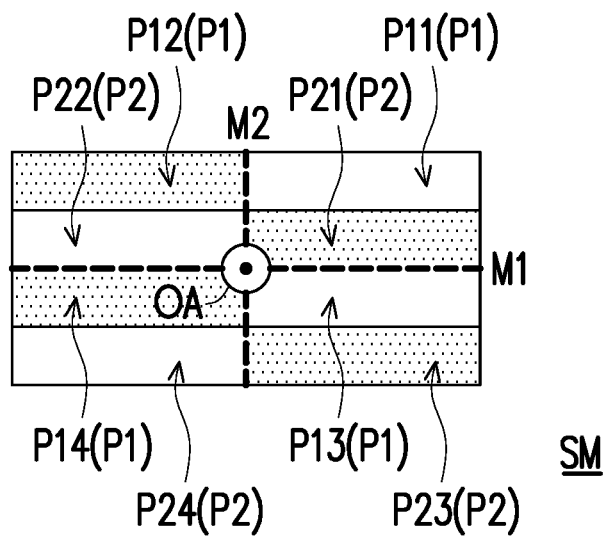
FIG. 10A is a front view of a multidirectional-plane of FIG. 9.
Figure 10B:
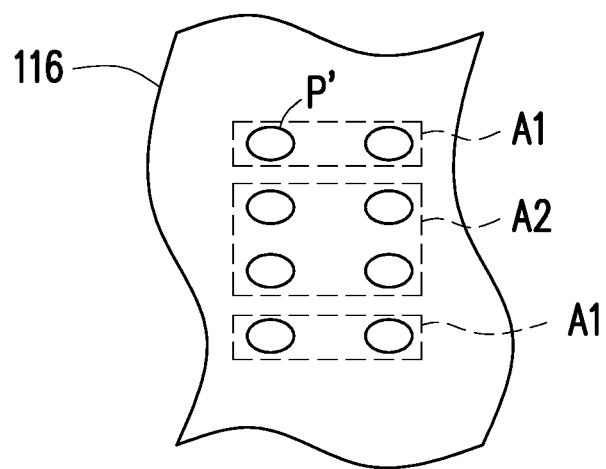
FIG. 10B is a partial front view of an optical wavelength conversion module of FIG. 9, which is used for representing light spots formed on the optical wavelength conversion module in case that the multidirectional-plane of FIG. 9 is configured.

FIG. 9 is a schematic diagram of a projection apparatus according to a second embodiment of the invention. FIG. 10A is a front view of a multidirectional-plane of FIG. 9. FIG. 10B is a partial front view of an optical wavelength conversion module of FIG. 9, which is used for representing of light spots formed on the optical wavelength conversion module in case that the multidirectional-plane of FIG. 9 is configured.

Referring to FIG. 9, the projection apparatus 200 of the second embodiment of the invention is similar to the projection apparatus 100 of FIG. 1, and main differences of the two embodiments are described below. In an illumination system 210 of the projection apparatus 200, a light source 212 includes a plurality of first light-emitting elements 212A and a plurality of second light-emitting elements 212B (two square frames are adopted to schematically represent the first light-emitting elements 212A and the second light-emitting elements 212B in FIG. 9). The first light-emitting elements 212A emit a plurality of first sub-light beams BA (an arrow is adopted to schematically represent the first sub-light beams BA in FIG. 9). The second light-emitting elements 212B emit a plurality of second sub-light beams BB (an arrow is adopted to schematically represent the second sub-light beams BB in FIG. 9).

Moreover, the first lens element 114 is disposed on a transmission path of the first sub-light beams BA and the second sub-light beams BB. The first sub-light beams BA respectively pass through a portion of sub-planes in the sub-planes (for example, the sub-planes with larger rotating angles), and the second sub-light beams BB respectively pass through another portion of sub-planes in the sub-planes (for example, the sub-planes with smaller rotating angles). As shown in FIG. 10A, the multidirectional-plane SM, for example, includes four first sub-planes P1 (for example, a first sub-plane P11, a first sub-plane P12, a first sub-plane P13 and a first sub-plane P14) and four second sub-planes P2 (for example, a second sub-plane P21, a second sub-plane P22, a second sub-plane P23 and a second sub-plane P24).

In the embodiment, the first sub-plane P11, the first sub-plane P12, the first sub-plane P13 and the first sub-plane P14 in FIG. 10A are respectively rotated along the first midline M1 and the second midline M2 by different angles with the reference plane RF of FIG. 2B, and the second sub-plane P21, the second sub-plane P22, the second sub-plane P23 and the second sub-plane P24 in FIG. 10A are respectively rotated along the first midline M1 and the second midline M2 by different angles with the reference plane RF of FIG. 2B. In the embodiment, if the clockwise rotation is represented by a positive value, and the counter-clockwise rotation is represented by a negative value, the first sub-plane P11 and the second sub-plane P23 are rotated by 1 degree along the first midline M1 and rotated by −0.8 degrees along the second midline M2; the first sub-plane P12 and the second sub-plane P24 are rotated by 1 degree along the first midline M1 and rotated by 0.8 degrees along the second midline M2; the first sub-plane P13 is rotated by 4 degrees along the first midline M1 and rotated by −0.8 degrees along the second midline M2; the first sub-plane P14 is rotated by 4 degrees along the first midline M1 and rotated by 0.8 degrees along the second midline M2; the second sub-plane P21 is rotated by −4 degrees along the first midline M1 and rotated by −0.8 degrees along the second midline M2; and the first sub-plane P22 is rotated by −4 degrees along the first midline M1 and rotated by 0.8 degrees along the second midline M2.

Moreover, the illumination system 210 further includes a first light diffusing element 211 and a second light diffusing element 213. The first light diffusing element 211 is disposed on a transmission path of the first sub-light beams BA transmitted from the first light-emitting elements 212A and is located between the first light-emitting elements 212A and the optical wavelength conversion module 116. The second light diffusing element 213 is disposed on a transmission path of the second sub-light beams BB transmitted from the second light-emitting elements 212B and is located between the second light-emitting elements 212B and the optical wavelength conversion module 116. The first light diffusing element 211 and the second light diffusing element 213 have different light diffusing effects. For example, the first light diffusing element 211 and the second light diffusing element 213 may be diffusers, and a haze of the first light diffusing element 211 is smaller than a haze of the second light diffusing element 213.

The first sub-light beams BA form four light spots P' in an area A1 on the optical wavelength conversion module 116 after passing through the sub-planes with larger rotating angles in the multidirectional-plane SM, and light uniformizing is performed through the first diffusing element 211 with a lower haze. The second sub-light beams BB form four light spots P' in an area A2 on the optical wavelength conversion module 116 after passing through the sub-planes with smaller rotating angles in the multidirectional-plane SM, and light uniformizing is performed through the second diffusing element 213 with a higher haze. In this way, a light spot design with a sharp edge, a center energy density of 50% and the area A1 of higher energy is obtained.

In the embodiment, the first lens element 114, for example, serves as a focusing lens. Correspondingly, a curved surface SC of the first lens element 114 is a convex surface adapted to converge the light beam. The illumination system 210 may further include a second lens element 215 serving as a collimating lens. The second lens element 215 is disposed between the first lens element 114 and the optical wavelength conversion module 116 to collimate the first sub-beams BA and the second sub-beams BB. The first light diffusing element 211 and the second light diffusing element 213 are disposed between the first lens element 114 and the second lens element 215, though the invention is not limited thereto. In an embodiment, the first light diffusing element 211 and the second light diffusing element 213 may be disposed between the light source 212 and the first lens element 114.

In another embodiment, the first lens element 114 may serve as a collimating element, and the curved surface SC of the first lens element 114 is a concave surface, where the concave surface may be located between the light source 212 and the multidirectional-plane SM, or the multidirectional-plane SM may be located between the light source 212 and the concave surface. Under such framework, the rotating angles of the first sub-planes P1 are respectively greater than 0 degrees and smaller than or equal to 12 degrees, and the rotating angles of the second sub-planes P2 are respectively greater than 0 degrees and smaller than or equal to 12 degrees.

According to other requirement, the illumination system 210 may further include other lens elements, light uniformizing elements or filter elements, etc., which is not repeated.

Figure 11:
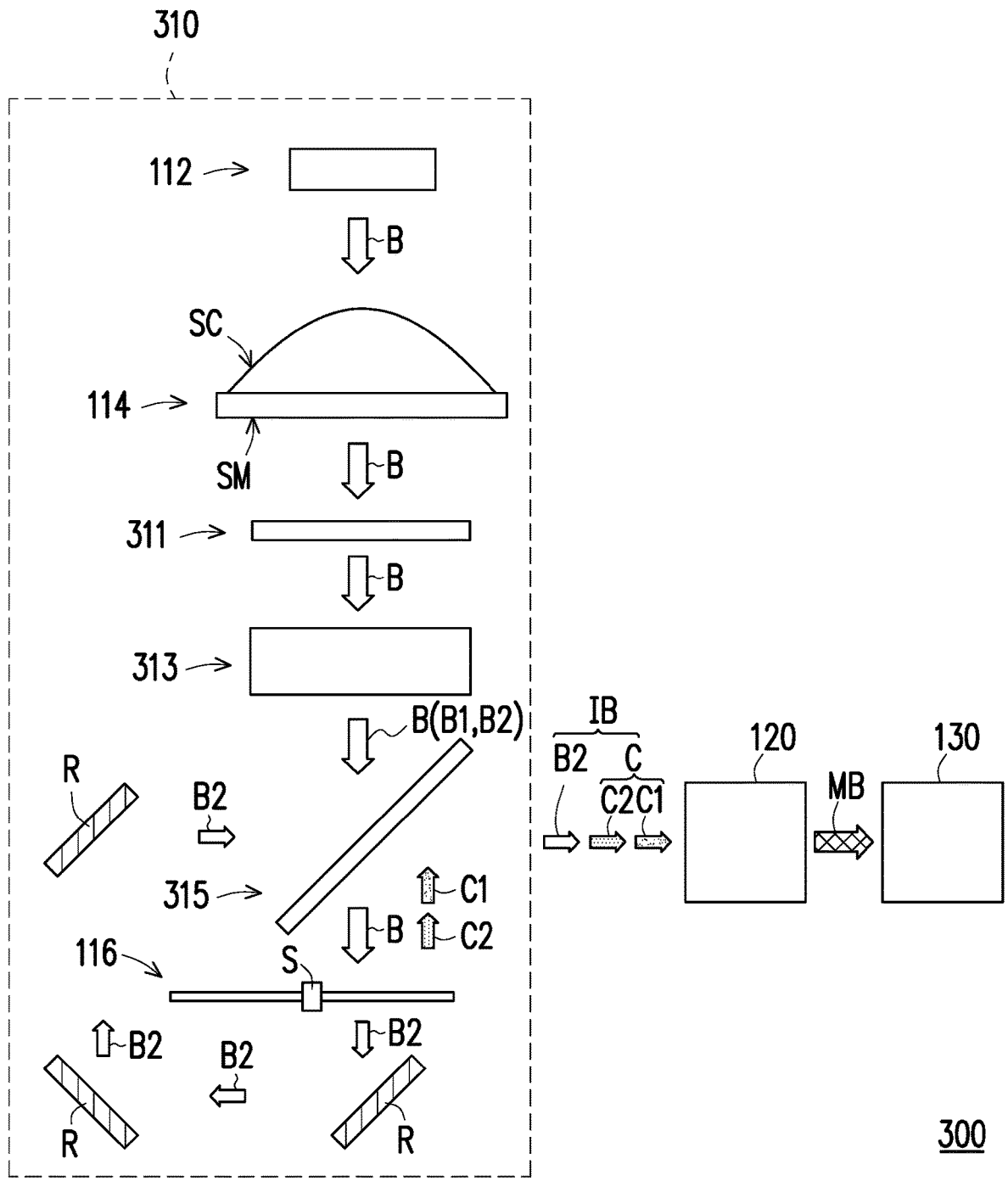
FIG. 11 and FIG. 12 are schematic diagrams of projection apparatuses according to a third embodiment and a fourth embodiment of the invention.
Figure 12:
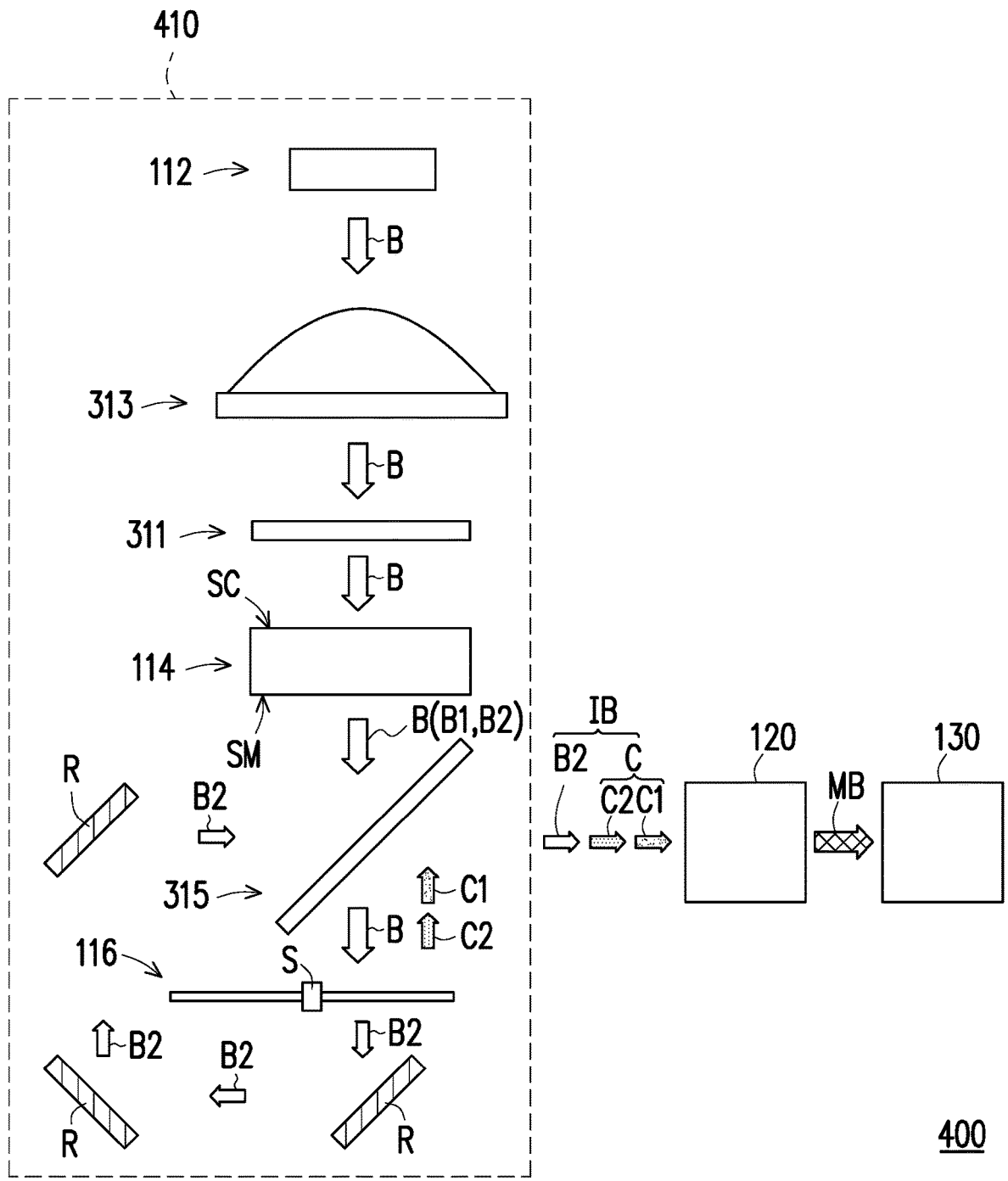

FIG. 11 and FIG. 12 are schematic diagrams of projection apparatuses according to a third embodiment and a fourth embodiment of the invention.

Referring to FIG. 11, the projection apparatus 300 of the third embodiment is similar to the projection apparatus 100 of FIG. 1, and main differences there between are as follows. In the projection apparatus 300, an illumination system 310 further includes a light diffusing element 311, a second lens element 313 and a light combining element 315.

The light diffusing element 311 is disposed on a transmission path of the light beam B transmitted from the first lens element 114. For example, the light diffusing element may include a diffuser, a lens array or a lenticular lens, though the invention is not limited thereto.

The second lens element 313 is disposed on a transmission path of the light beam B transmitted from the light diffusing element 311, so as to collimate the light beam B from the light diffusing element 311. For example, the second lens element 313 may be a plano-concave lens, though the invention is not limited thereto.

The light combining element 315 is disposed on a transmission path of the light beam B transmitted from the second lens element 313, and the optical wavelength conversion module 116 is disposed a transmission path of the light beam B transmitted from the light combining element 315. In the embodiment, the light combining element 315 is adapted to allow the light beam B to pass through and reflects the converted light beam C (which, for example, includes the red light beam C1 and the green light beam C2).

The optical wavelength conversion module 116 is, for example, a reflective optical wavelength conversion module. Further, a substrate (not shown) used for carrying the optical wavelength conversion layer in the optical wavelength conversion module 116 is a reflective substrate (for example, a metal substrate or a transparent substrate coated with a reflection layer), and the penetration region of the reflective substrate has an opening (not shown) adapted to allow the second portion B2 of the light beam B to pass through. The illumination system 310 further includes a plurality of reflecting elements R, so that the second portion B2 of the light beam B passing through an opening (the penetration region) of the optical wavelength conversion module is transmitted back to the light combining element 315 and passes through the light combining element 315 to reach the light valve 120.

In an embodiment, the multidirectional-plane SM may be located between the light source 112 and the curved surface SC. In another embodiment, the light diffusing element 311 may be disposed between the light source 112 and the first lens element 114 or between the second lens element 313 and the light combining element 315.

Under the framework of FIG. 11, the rotating angles of the sub-planes of the multidirectional-plane SM are, for example, respectively greater than 0 degrees and smaller than or equal to 6 degrees.

Referring to FIG. 12, the projection apparatus 400 of the fourth embodiment of the invention is similar to the projection apparatus 300 of FIG. 11, and main differences of the two embodiments are described below.

In FIG. 11, the first lens element 114 is disposed between the light source 112 and the light diffusing element 311, where the first lens element 114 serves as a focusing lens, and the curved surface SC of the first lens element 114 is a convex surface. Moreover, the second lens element 313 is disposed between the light diffusing element 311 and the light combining element 315, where the second lens element 313 serves as a collimating element, such as a plano-concave lens, though the invention is not limited thereto.

On the other hand, in FIG. 12, the second lens element 313 is disposed on the transmission path of the light beam B transmitted from the light source 112 to converge the light beam B from the light source 112. Further, the second lens element 313 is disposed between the light source 112 and the light diffusing element 311, where the second lens element 313 serves as a focusing lens, for example, a plano-convex lens, though the invention is not limited thereto. Moreover, the light diffusing element 311 is disposed on the transmission path of the light beam B from the second lens element 313. The first lens element 114 is disposed on the transmission path of the light beam B from the light diffusing element 311, and the light combining element 315 is disposed on the transmission path of the light beam B transmitted from the first lens element 114. Further, the first lens element 114 is disposed between the light diffusing element 311 and the light combining element 315, where the first lens element 114 serves as a collimating element, and the curved surface SC of the first lens element 114 is a concave surface. In the embodiment, the curved surface SC is located between the light source 112 and the multidirectional-plane SM. However, in another embodiment, the multidirectional-plane SM may also be located between the light source 112 and the curved surface SC.

Under the framework of FIG. 12, the rotating angles of the sub-planes of the multidirectional-plane SM are, for example, respectively greater than 0 degrees and smaller than or equal to 12 degrees.

In summary, the embodiments of the invention have at least one of following advantages or effects. The multidirectional-plane is adapted to refract the light beam to different positions of the optical wavelength conversion module to achieve an effect of dispersing energy density of the light beam. Therefore, the illumination system of the embodiments of the invention is adapted to effectively mitigate problems of burning of the optical wavelength conversion module and decrease of light conversion efficiency due to over concentration of the beam energy. Moreover, the projection apparatus of the embodiments of the invention adopts the aforementioned illumination system to achieve good performance (for example, good light conversion efficiency and light receiving efficiency). In an embodiment, the illumination system may include a light diffusing element to further uniformize the energy distribution of the light spots formed on the optical wavelength conversion module. In another embodiment, the light diffusing element may be omitted, or a light diffusing element (for example, a lens array) with high cost may be replaced by a light diffusing element (for example, a diffuser) with low cost, so as to reduce cost and mitigate an influence of assembly tolerance on optical quality. Alternatively, a light diffusing element (for example, a lens array) with a complicated design may be replaced by a light diffusing element (for example, a lenticular lens) with a simple design. In still another embodiment, the asymmetrical light spots may be designed by adjusting the numbers and the rotating angles of the sub-planes of the multidirectional-plane, so as to be adapted to a special optical engine system. In still another embodiment, a plurality of light diffusing elements with different light diffusing effects are used to control the energy density around and inside the light spots.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
    an illumination system, comprising:
        a light source, emitting a light beam;
        a first lens element, disposed on a transmission path of the light beam emitted from the light source, wherein the first lens element has a curved surface and a multidirectional-plane, the multidirectional-plane and the curved surface are two opposite surfaces in the first lens element, the multidirectional-plane comprises a plurality of sub-planes formed by being rotated in different directions, the multidirectional-plane has a first midline and a second midline being perpendicular to each other, the first midline and the second midline are respectively perpendicular to an optical axis of the illumination system, and the sub-planes comprise a plurality of first sub-planes and a plurality of second sub-planes, wherein the first sub-planes are respectively formed by rotating a reference plane perpendicular to the optical axis of the illumination system by different angles along the first midline of the multidirectional-plane, and the second sub-planes are respectively formed by rotating the reference plane by different angles along the second midline of the multidirectional-plane, wherein the plurality of formed sub-planes facing different directions refract the light beam from the light source passed through the curved surface to different positions on an optical wavelength conversion module; and
        the optical wavelength conversion module, disposed on a transmission path of the light beam transmitted from the first lens element, wherein the optical wavelength conversion module converts a first portion of the light beam transmitted from the first lens element into a converted light beam, and the converted light beam and a second portion of the light beam transmitted from the first lens element form an illumination beam;
    a light valve, disposed on a transmission path of the illumination beam and converting the illumination beam into an image beam; and
    a projection lens, disposed on a transmission path of the image beam.

2. The projection apparatus as claimed in claim 1, wherein the light source comprises a plurality of first light-emitting elements and a plurality of second light-emitting elements, the first light-emitting elements emit a plurality of first sub-beams, the second light-emitting elements emit a plurality of second sub-beams, the first lens element is disposed on transmission paths of the first sub-beams and the second sub-beams, wherein the first sub-beams respectively pass through a portion of sub-planes in the sub-planes, and the second sub-beams respectively pass through another portion of sub-planes in the sub-planes, and the illumination system further comprises:
    a first light diffusing element, disposed on the transmission paths of the first sub-beams and located between the first light-emitting elements and the optical wavelength conversion module; and
    a second light diffusing element, disposed on the transmission paths of the second sub-beams and located between the second light-emitting elements and the optical wavelength conversion module, wherein the first light diffusing element and the second light diffusing element have different light diffusing effects.

3. The projection apparatus as claimed in claim 2, wherein the portion of sub-planes in the sub-planes has a larger rotating angle, and the another portion of sub-planes in the sub-planes has a smaller rotating angle.

4. The projection apparatus as claimed in claim 3, wherein the first light diffusing element and the second light diffusing element are respectively diffusers, and a haze of the first light diffusing element is smaller than a haze of the second light diffusing element.

5. The projection apparatus as claimed in claim 1, wherein a plurality of rotating angles of the first sub-planes are respectively greater than 0 degrees and smaller than or equal to 12 degrees, and a plurality of rotating angles of the second sub-planes are respectively greater than 0 degrees and smaller than or equal to 12 degrees.

6. The projection apparatus as claimed in claim 1, wherein the curved surface of the first lens element is a convex surface.

7. The projection apparatus as claimed in claim 6, wherein the illumination system further comprises:
    a light diffusing element, disposed on the transmission path of the light beam from the first lens element;
    a second lens element, disposed on a transmission path of the light beam from the light diffusing element to collimate the light beam from the light diffusing element; and
    a light combining element, disposed on a transmission path of the light beam from the second lens element, wherein the optical wavelength conversion module is disposed on a transmission path of the light beam from the light combining element.

8. The projection apparatus as claimed in claim 1, wherein the curved surface of the first lens element is a concave surface, and the illumination system further comprises:
   a second lens element, disposed on the transmission path of the light beam from the light source to converge the light beam emitted from the light source, wherein the first lens element is disposed on a transmission path of the light beam from the second lens element; and
   a light combining element, disposed on the transmission path of the light beam transmitted from the first lens element, and the optical wavelength conversion module is disposed on a transmission path of the light beam transmitted from the light combining element.

9. The projection apparatus as claimed in claim 8, wherein the illumination system further comprises:
   a light diffusing element, disposed on the transmission path of the light beam from the second lens element, and the first lens element is disposed on a transmission path of the light beam transmitted from the light diffusing element.

10. An illumination system, comprising:
    a light source, emitting a light beam;
    a first lens element, disposed on a transmission path of the light beam emitted from the light source, wherein the first lens element has a curved surface and a multidirectional-plane, the multidirectional-plane and the curved surface are two opposite surfaces in the first lens element, the multidirectional-plane comprises a plurality of sub-planes formed by being rotated in facing different directions, the multidirectional-plane has a first midline and a second midline being perpendicular to each other, the first midline and the second midline are respectively perpendicular to an optical axis of the illumination system, and the sub-planes comprise a plurality of first sub-planes and a plurality of second sub-planes, wherein the first sub-planes are respectively formed by rotating a reference plane perpendicular to the optical axis of the illumination system by different angles along the first midline of the multidirectional-plane, and the second sub-planes are respectively formed by rotating the reference plane by different angles along the second midline of the multidirectional-plane, wherein the plurality of formed sub-planes facing different directions refract the light beam from the light source passed through the curved surface to different positions on an optical wavelength conversion module; and
    the optical wavelength conversion module, disposed on a transmission path of the light beam transmitted from the first lens element, wherein the optical wavelength conversion module converts a first portion of the light beam transmitted from the first lens element into a converted light beam, and the converted light beam and a second portion of the light beam transmitted from the first lens element form an illumination beam.

\* \* \* \* \*